United States Patent [19]

Quesnel et al.

[11] Patent Number: 4,972,466
[45] Date of Patent: Nov. 20, 1990

[54] DIGITAL COMPOSITE TONE ALERTING

[75] Inventors: Guy Quesnel, Nepean; David Lynch, Kanata, both of Canada

[73] Assignee: Northern Telecom Limited, Quebec, Canada

[21] Appl. No.: 406,860

[22] Filed: Sep. 12, 1989

Related U.S. Application Data

[63] Continuation of Ser. No. 189,327, May 2, 1988, abandoned.

[30] Foreign Application Priority Data

Apr. 4, 1988 [CA] Canada ............................ 560534

[51] Int. Cl.$^5$ ............................................. H04M 1/00
[52] U.S. Cl. .................................. 379/375; 370/68.1; 379/253; 379/418
[58] Field of Search .................... 370/68.1, 85, 110.2; 379/252, 375, 253, 373, 164, 418; 329/193

[56] References Cited

U.S. PATENT DOCUMENTS 3,924,077 12/1975 Blakeslee ........................... 370/85 X
4,322,581 3/1982 Christain et al. ............... 379/375 X
4,477,697 10/1984 Judd et al. ........................... 379/375
4,534,041 8/1985 Münter ........................... 379/386 X
4,658,419 4/1987 Denen ................................. 379/375

FOREIGN PATENT DOCUMENTS 0089165 7/1981 Japan ................................... 379/375

OTHER PUBLICATIONS

"The Digital Telephone: Keyphone 1000", J. A. Tritton et al., GEC Telecommunications Journal 41, 1980, pp. 17-21.

Primary Examiner—Jin F. Ng
Assistant Examiner—Magdy Shehata
Attorney, Agent, or Firm—Saidman, Sterne, Kessler & Goldstein

[57] ABSTRACT

Within a digital PBX system or the like, an appartaus permits provision of digital composite tone alerting particularly suitable for piezoelectric transducers with one arbitrarily selectable tone, by means of logic circuits for latching the sign-bit in a received PCM signal that exceeds a validity threshold, and by combining the toggling sign-bit with another tone to yield the composite tone.

3 Claims, 2 Drawing Sheets

DIGITAL COMPOSITE TONE ALERTING

This application is a continuation of application Ser. No. 189,327, filed May 2, 1988 now abandoned.

BACKGROUND OF THE INVENTION

1. Field of the Invention

The present invention relates to digital telephony in general and in particular to tone alerting in digital PBX systems, digital key systems, or the like. More particularly still, it relates to digital composite tone alerting in such systems. The apparatus is particularly suitable for systems having digital telephone stations wherein the electro-acoustic transducers are of the piezoelectric type.

2. Related Art

In present telephone systems it is known to provide tone ringing or other audible alerting by using a composite tone comprising two pre-set tone frequencies. In North American telephony, there are five standard tones, two of which provide the composite tone by OR'ing or superposition. The standard five tones are 1000, 667, 500, 333 and 250 Hz. These tones are normally generated locally and audible alerting is restricted accordingly to such fixed tones.

SUMMARY OF THE INVENTION

It is desirable for various reasons to provide tone alerting that is more diverse and not restricted to two-tone combinations of five fixed tones. For one thing, it is then possible to provide tone alerting that is tailored to the particular environment within which a PBX system operates. For example, there may be a number of telephone stations or extensions in an office within earshot of each other where it is an irritant to have all extensions ringing at the same composite tone. It would be much more meaningful to provide distinctive tone ringing to extensions particularly within the open office concept.

The present invention, therefore, endeavors to provide flexibility in tone alerting be it for the above-mentioned reason or for other, user determined, reasons.

The present invention provides minimal apparatus for reconstructing in the digital telephone extension or station an arbitrary tone having a frequency within the permitted band of PCM encoded signals within the system. The arbitrary tone may, of course, be generated within the PBX or key system itself, or it may be relayed from a remote switching center or system.

Accordingly, the present invention provides an apparatus for digital composite tone alerting comprising:

logic means for deciding whether a PCM encoded signal has attained or exceeded a predetermined value;

latching means, responsive to said logic means for latching a bit in a predetermined bit position in said PCM encoded signal to yield a latched bit; and means for combining said latched bit with a predetermined tone to provide said digital composite tone.

In a narrower aspect of the invention, said predetermined bit position is the sign-bit position.

BRIEF DESCRIPTION OF THE DRAWINGS

A preferred embodiment of the present invention will now be described in detail in conjunction with the attached drawing figures, in which.

DETAILED DESCRIPTION OF THE PREFERRED EMBODIMENT

Figure 1:
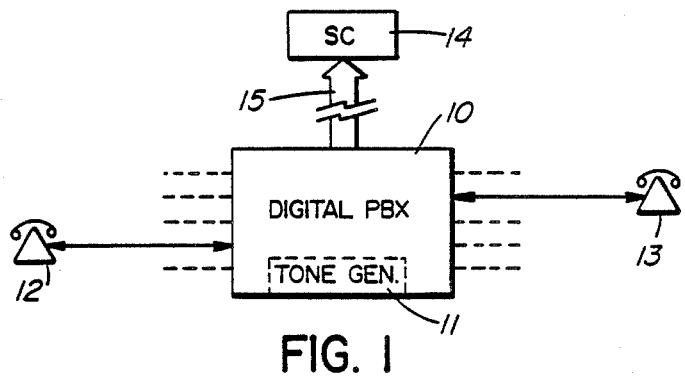
FIG. 1 is a block diagram depicting a digital PBX system.

FIG. 1 of the drawings shows a digital PBX system comprising a digital PBX 10 having a tone generator 11 for generating arbitrarily selectable digitally encoded tones, and first and second digital extension terminal 12 and 13. The digital PBX 10 is connected to a more or less remote switching center (SC) 14 by means of interconnecting trunks 15.

Figure 2:
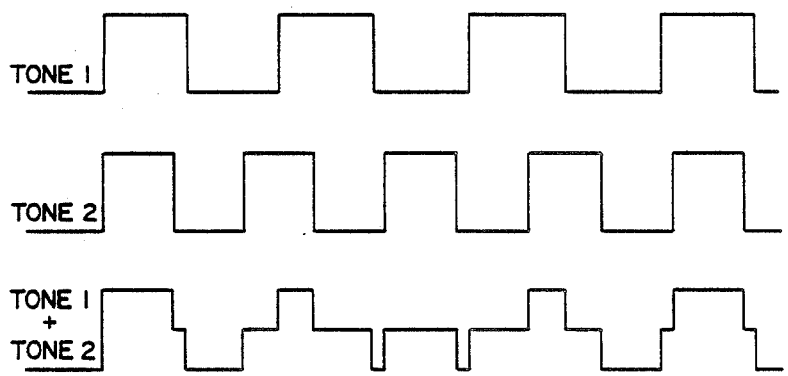
FIG. 2 illustrates how two tones are combined to produce a composite tone.

The digital extension terminals 12 and 13 have electro-acoustic transducers, preferably of the piezoelectric type, for audible tone ringing and alerting. Such piezoelectric transducers are particularly suitable for being energized or driven by square-wave potentials as are shown in FIG. 2 of the drawings. For composite tone ringing and alerting, two tones, tone 1 and tone 2, are combined to simply yield (tone 1+tone 2) shown at the bottom of FIG. 2. This composite tone, depending on its single tone components, could identify a certain extension terminal among several within earshot of the hearer, or may be used to identify a certain individual to answer it or a certain alerting status. One of the tones 1 and 2 is preferably one of the standard tones above-mentioned. The other of the two tones is the one arbitrarily selected to identify a particular alerting status, terminal, individual, or the like. The only restriction, of course, is that it must fall within the PCM frequency based on the PBX system.

Figure 3:
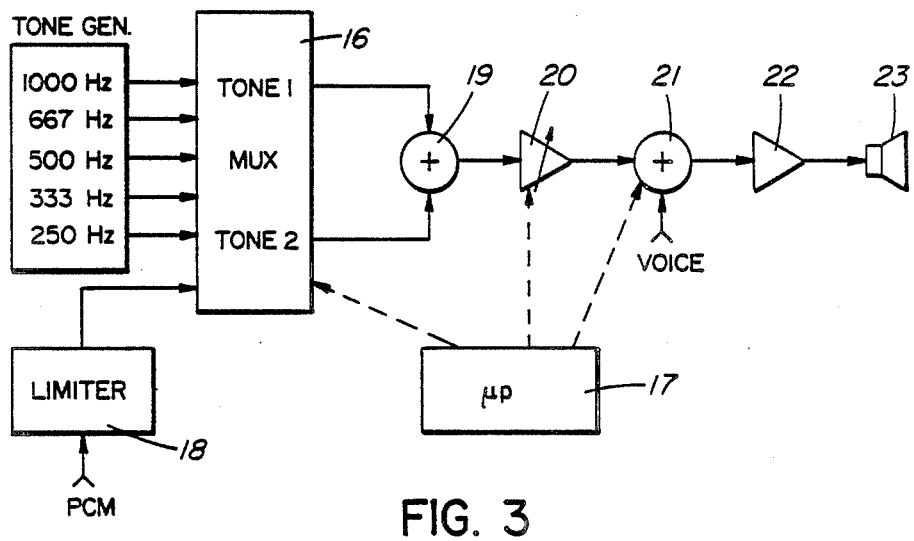
FIG. 3 is a block diagram of the digital composite tone alerting circuit.
Figure 4:
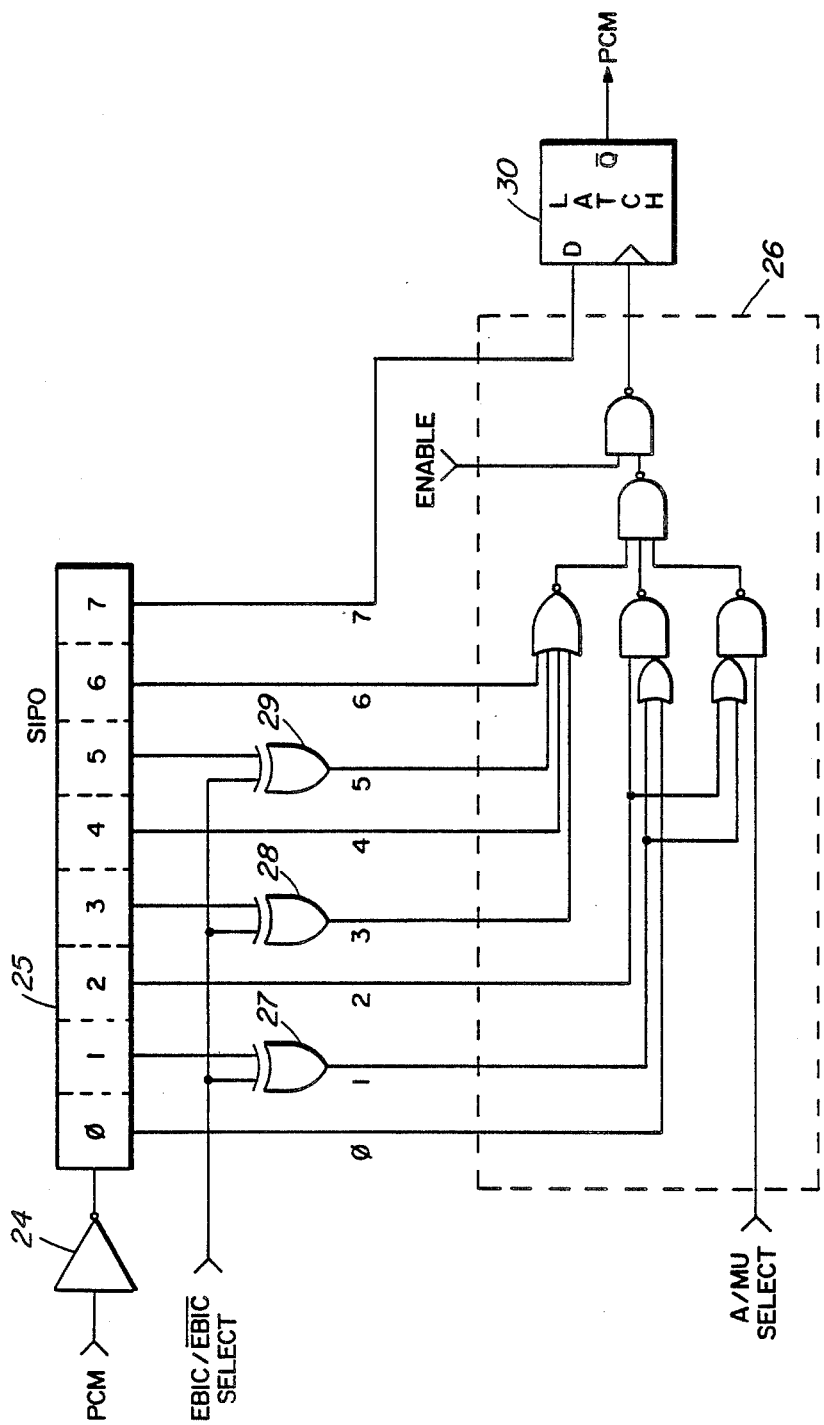
FIG. 4 is a block circuit diagram of the block labelled "limiter" in FIG. 3.

FIG. 3 of the drawings shows how in a terminal such as 12 a multiplexer (MUX) 16 selects under control of the local microprocessor 17 one of the standard sets of tones generated by the tone generator 11 and another tone supplied by digital limiter 18 and supplies them to the summer 19, which is followed by a variolosser 20 (for volume control) and then a second scanner 21, for adding the voice communications if desired, to finally drive audio amplifier 22, which in turn energizes a piezoelectric, electro-acoustic, transducer 23. How the second tone is recovered from the PCM signal relayed by the PBX to the terminal 12 without digital-to-analog conversion is shown in FIG. 4 of the drawings.

As is well-known, PCM encoded signals may follow various companding laws and standards, most widespread among which are the A-Laq and the MU-Law. The circuit of FIG. 4 adjusts its threshold of PCM tone recognition to suit either A- or MU-Law PCM signals, and also whether the PCM signal is transmitted as an even-bit-inverted-code (EBIC) or not (EBIC). The circuit receiving the incoming PCM word, which is inverted in invertor 24, is then serially latched into a SIPO register (serial-in-parallel-out) 25. The bits latched momentarily in the register 25 comprise eight bits, bit 0 being the least-significant bit (LSR), and bit 7 being the most-significant bit (MSB) or sign-bit. It is in fact the sign-bit in bit-position 7 that is used to digitally reconstruct the square-wave tone 2 without A/D conversion. For as the sign-bit toggles between the logic states zero and one, it is toggling at the basic frequency of tone 2. However, in order to prevent the toggling of the sign-bit due to noise being recognized as tone 2, it is necessary to ensure that the signal level encoded by the PCM word exceeds a certain minimum level, here preferably selected to be −55 dbm, which level (normalized) corresponds approximately to 5 of 4196 coding units for A-Law and 9.9 of 8159 coding units for MU-Law. Such information, i.e. whether the PCM is A- or MU-Law, as well as whether the code is EBIC or not, is written by the microprocessor 17 into a register (not shown) which controls the leads EBIC/$\overline{\text{EBIC}}$ select and A/MU select. In FIG. 4, a logic array 26 performs the threshold decision operation after conversion of the PCM word by means of three exclusive R-gates 27, 28 and 29, which convert the PCM word latched (after inversion) in the SIPO register 25 according to the following truth-table.

| EBIC = 0 | EBIC = 1 | OUTPUT |
|---|---|---|
| 7 6 5 4 3 2 1 0 | 7 6 5 4 3 2 1 0 | 7 6 5 4 3 2 1 0 |
| 1 1 1 1 1 1 1 1 | 1 1 0 1 0 1 0 1 | 0 0 0 0 0 0 0 0 |
| 1 1 1 1 1 1 1 0 | 1 1 0 1 0 1 0 0 | 0 0 0 0 0 0 0 1 |
| 1 1 1 1 1 1 0 1 | 1 1 0 1 0 1 1 1 | 0 0 0 0 0 0 1 0 |
| 1 1 1 1 1 1 0 0 | 1 1 0 1 0 1 1 0 | 0 0 0 0 0 0 1 1 |
| 1 1 1 1 1 0 1 1 | 1 1 0 1 0 0 0 1 | 0 0 0 0 0 1 0 0 |
| 1 1 1 1 1 0 1 0 | 1 1 0 1 0 0 0 0 | 0 0 0 0 0 1 0 1 |
| 1 1 1 1 1 0 0 1 | 1 1 0 1 0 0 1 1 | 0 0 0 0 0 1 1 0 |
| 1 1 1 1 1 0 0 0 | 1 1 0 1 0 0 0 0 | 0 0 0 0 0 1 1 1 |

-continued

| EBIC = 0 | EBIC = 1 | OUTPUT |
|---|---|---|
| 7 6 5 4 3 2 1 0 | 7 6 5 4 3 2 1 0 | 7 6 5 4 3 2 1 0 |
| 1 1 1 1 0 1 1 1 | 1 1 0 1 1 1 0 1 | 0 0 0 0 1 0 0 0 |

As may be seen, the output code in the table simply represents an increasing positive level, which is recognized as a solid signal if it equates or exceeds "10" for A-Law and "101" for MU-Law. When that occurs, the seventh (sign) bit is latched into latch 30, the Q-output of which constitutes the square-wave tone supplied by the limiter 18 to the MUX 16 (in tone 2).

What is claimed is:

1. Apparatus for digital composite tone alerting comprising:
   logic means for deciding whether a PCM encoded first tone signal has attained or exceeded a predetermined level;
   latching means, responsive to said logic means, for latching a bit, toggling at the frequency of the first tone signal frequency, in a predetermined bit position in said PCM encoded first tone signal to yield a latched bit; and
   means for combining said latched bit with a second tone to provide said digital composite tone alerting.

2. The apparatus as defined in claim 1, said predetermined bit position being the sign-bit position.

3. The apparatus as defined in claim 1, said predetermined bit position being the most-significant bit (MSB) position.

* * * * *